US011928992B1

(12) United States Patent
Seder et al.

(10) Patent No.: US 11,928,992 B1
(45) Date of Patent: Mar. 12, 2024

(54) AUTOMATED VEHICLE DISPLAY CALIBRATION

(71) Applicant: GM Global Technology Operations LLC, Detroit, MI (US)

(72) Inventors: Thomas A. Seder, Fraser, MI (US); Joseph F. Szczerba, Grand Blanc, MI (US); John P. Weiss, Shelby Township, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/194,923

(22) Filed: Apr. 3, 2023

(51) Int. Cl.
*G02B 27/01* (2006.01)
*G06T 7/73* (2017.01)
*G09G 3/00* (2006.01)

(52) U.S. Cl.
CPC ............. *G09G 3/001* (2013.01); *G06T 7/74* (2017.01); *G09G 2320/0693* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 6,639,733 | B2 | 10/2003 | Minano et al. |
| 7,286,296 | B2 | 10/2007 | Chaves et al. |
| 2005/0086032 | A1 | 4/2005 | Benitez et al. |
| 2005/0243570 | A1 | 11/2005 | Chaves et al. |
| 2010/0253918 | A1 | 10/2010 | Seder et al. |
| 2017/0212633 | A1 | 7/2017 | You et al. |
| 2020/0254877 | A1 | 8/2020 | Nakajima et al. |
| 2021/0191132 | A1 | 6/2021 | Karner et al. |
| 2021/0360211 | A1 | 11/2021 | Kawamura |

FOREIGN PATENT DOCUMENTS

DE 102017004859 A1 * 11/2018 ............. B60K 35/00

OTHER PUBLICATIONS

Translation of DE-102017004859-A1 into English; Schmid et al. (Year: 2018).*
Dross, et al. "Non-imaging optics combine LEDs into one bright source," SPIE, Jun. 27, 2006, https://spie.org/news/0197-non-imaging-optics-combine-leds-into-one-bright-source?SSO=1.
United States Patent and Trademark Office. U.S. Appl. No. 17/749,464, filed May 20, 2022.
United States Patent and Trademark Office. U.S. Appl. No. 18/186,343, filed Mar. 20, 2023.

* cited by examiner

*Primary Examiner* — Brian M Butcher
(74) *Attorney, Agent, or Firm* — Vivacqua Crane, PLLC

(57) ABSTRACT

A system for calibrating a display for a vehicle includes a reference calibration system including a reference windscreen and a reference transparent windscreen display (TWD) projector including a reference TWD camera. The reference calibration system also includes a reference camera and a reference controller in electrical communication with the reference TWD projector and the reference camera. The reference controller is programmed to project a reference graphic on the reference windscreen using the reference TWD projector. The reference controller is further programmed to capture a first reference image of the reference graphic using the reference camera. The reference controller is further programmed to calculate at least one reference calibration matrix based at least in part on the first reference image of the reference graphic.

19 Claims, 7 Drawing Sheets

AUTOMATED VEHICLE DISPLAY CALIBRATION

INTRODUCTION

The present disclosure relates to head-up display (HUD) systems, and more particularly, to calibrating a display for a vehicle.

To enhance occupant awareness and convenience, vehicles may be equipped with HUD systems, which are designed to project critical information onto the windscreen in the occupant's field of view. HUD systems may display a variety of information, such as vehicle speed, navigation instructions, infotainment information, and other notifications. By displaying this information in the occupant's line of sight, HUD systems increase occupant awareness of the occupant while providing additional information for occupant convenience. However, HUD systems may require calibration to account for variables introduced by manufacturing variation of components of the HUD system and/or installation variation of components of the HUD system during vehicle assembly. Additionally, calibration of HUD systems during vehicle assembly may result in increased time and resource use during vehicle production.

Thus, while current HUD systems achieve their intended purpose, there is a need for a new and improved system and method for calibrating a display for a vehicle.

SUMMARY

According to several aspects, a system for calibrating a display for a vehicle is provided. The system includes a reference calibration system. The reference calibration system includes a reference windscreen and a reference transparent windscreen display (TWD) projector. The reference TWD projector includes a reference TWD camera. The reference calibration system also includes a reference camera and a reference controller in electrical communication with the reference TWD projector and the reference camera. The reference controller is programmed to project a reference graphic on the reference windscreen using the reference TWD projector. The reference graphic includes a plurality of projected dots arranged in a two-dimensional array. An intended x-coordinate and an intended y-coordinate of each of the plurality of projected dots is defined by an intended reference graphic matrix. The reference controller is further programmed to capture a first reference image of the reference graphic using the reference camera. The reference controller is further programmed to calculate at least one reference calibration matrix based at least in part on the first reference image of the reference graphic.

In another aspect of the present disclosure, to calculate the at least one reference calibration matrix, the reference controller is further programmed to determine a reference camera deviation matrix. The reference camera deviation matrix encodes deviations in the reference graphic due to characteristics of the reference windscreen. To calculate the at least one reference calibration matrix, the reference controller is further programmed to determine a reference TWD camera transformation matrix based at least in part on the reference camera deviation matrix.

In another aspect of the present disclosure, to determine the reference camera deviation matrix, the reference controller is further programmed to identify a plurality of perceived dots of the reference graphic in the first reference image. To determine the reference camera deviation matrix, the reference controller is further programmed to determine an actual x-coordinate and an actual y-coordinate of each of the plurality of perceived dots of the reference graphic in the first reference image. To determine the reference camera deviation matrix, the reference controller is further programmed to generate an actual reference graphic matrix. Each element of the actual reference graphic matrix contains the actual x-coordinate and the actual y-coordinate of one of the plurality of perceived dots of the reference graphic in the first reference image. To determine the reference camera deviation matrix, the reference controller is further programmed to calculate the reference camera deviation matrix by subtracting the actual reference graphic matrix from the intended reference graphic matrix.

In another aspect of the present disclosure, to determine the reference TWD camera transformation matrix, the reference controller is further programmed to generate a deviation-compensated reference graphic matrix by summing the intended reference graphic matrix and the reference camera deviation matrix. To determine the reference TWD camera transformation matrix, the reference controller is further programmed to project a deviation-compensated reference graphic on the reference windscreen using the reference TWD projector. A location of each of a plurality of projected dots of the deviation-compensated reference graphic is defined by the deviation-compensated reference graphic matrix. To determine the reference TWD camera transformation matrix, the reference controller is further programmed to capture a second reference image of the deviation-compensated reference graphic using the reference TWD camera. To determine the reference TWD camera transformation matrix, the reference controller is further programmed to identify a plurality of perceived dots of the deviation-compensated reference graphic in the second reference image. To determine the reference TWD camera transformation matrix, the reference controller is further programmed to determine an actual x-coordinate and an actual y-coordinate of each of the plurality of perceived dots of the deviation-compensated reference graphic in the second reference image. To determine the reference TWD camera transformation matrix, the reference controller is further programmed to generate a reference TWD camera matrix. Each element of the reference TWD camera matrix contains the actual x-coordinate and the actual y-coordinate of one of the plurality of perceived dots of the deviation-compensated reference graphic in the second reference image. To determine the reference TWD camera transformation matrix, the reference controller is further programmed to determine the reference TWD camera transformation matrix by subtracting the reference TWD camera matrix from the reference camera deviation matrix.

In another aspect of the present disclosure, the system for calibrating a display for a vehicle further includes a vehicle display system. The vehicle display system includes a vehicle windscreen and a vehicle TWD projector. The vehicle TWD projector includes a vehicle TWD camera. The vehicle display system further includes a vehicle controller in electrical communication with the vehicle TWD projector. The vehicle controller is programmed to project the reference graphic on the vehicle windscreen using the vehicle TWD projector. The vehicle controller is further programmed to capture a calibration image of the reference graphic using the vehicle TWD camera. The vehicle controller is further programmed to calculate a vehicle TWD calibration matrix based at least in part on the at least one reference calibration matrix and the calibration image of the reference graphic.

In another aspect of the present disclosure, to calculate the vehicle TWD calibration matrix, the vehicle controller is further programmed to determine a vehicle TWD deviation matrix based at least in part on the at least one reference calibration matrix and the calibration image of the reference graphic. To calculate the vehicle TWD calibration matrix, the vehicle controller is further programmed to calculate the vehicle TWD calibration matrix based at least in part on the vehicle TWD deviation matrix.

In another aspect of the present disclosure, To determine the vehicle TWD deviation matrix, the vehicle controller is further programmed to identify a plurality of perceived dots of the reference graphic in the calibration image. To determine the vehicle TWD deviation matrix, the vehicle controller is further programmed to determine an actual x-coordinate and an actual y-coordinate of each of the plurality of perceived dots of the reference graphic in the calibration image. To determine the vehicle TWD deviation matrix, the vehicle controller is further programmed to generate an actual vehicle TWD matrix. Each element of the actual vehicle TWD matrix contains the actual x-coordinate and the actual y-coordinate of one of the plurality of perceived dots of the reference graphic in the calibration image. To determine the vehicle TWD deviation matrix, the vehicle controller is further programmed to calculate the vehicle TWD deviation matrix by subtracting the actual vehicle TWD matrix from the reference TWD camera matrix.

In another aspect of the present disclosure, to calculate the vehicle TWD calibration matrix, the vehicle controller is further programmed to calculate the vehicle TWD calibration matrix by subtracting the TWD deviation matrix from the reference TWD camera transformation matrix.

In another aspect of the present disclosure, the vehicle controller is further programmed to apply the vehicle TWD calibration matrix to each frame projected using the vehicle TWD projector.

In another aspect of the present disclosure, the reference camera is fixedly mounted at a reference occupant eyellipse location. The reference occupant eyellipse location is a predetermined location in space relative to the reference windscreen.

According to several aspects, a method for calibrating a display for a vehicle is provided. The method includes projecting a reference graphic on a reference windscreen using a reference transparent windscreen display (TWD) projector. The method further includes capturing a first reference image of the reference graphic using a reference camera. The method further includes determining a reference camera deviation matrix. The reference camera deviation matrix encodes deviations in the reference graphic due to characteristics of the reference windscreen. The method further includes determining a reference TWD camera transformation matrix based at least in part on the reference camera deviation matrix. The method further includes projecting the reference graphic on a vehicle windscreen using a vehicle TWD projector. The method further includes capturing a calibration image of the reference graphic using a vehicle TWD camera. The method further includes calculating a vehicle TWD calibration matrix based at least in part on the reference camera deviation matrix, the reference TWD camera transformation matrix, and the calibration image.

In another aspect of the present disclosure, determining the reference camera deviation matrix further may include identifying a plurality of perceived dots of the reference graphic in the first reference image. Determining the reference camera deviation matrix further may include determining an actual x-coordinate and an actual y-coordinate of each of the plurality of perceived dots of the reference graphic in the first reference image. Determining the reference camera deviation matrix further may include generating an actual reference graphic matrix. Each element of the actual reference graphic matrix contains the actual x-coordinate and the actual y-coordinate of one of the plurality of perceived dots of the reference graphic in the first reference image. Determining the reference camera deviation matrix further may include calculating the reference camera deviation matrix by subtracting the actual reference graphic matrix from an intended reference graphic matrix. The intended reference graphic matrix is a two-dimensional array including an intended x-coordinate and an intended y-coordinate of each of a plurality of projected dots.

In another aspect of the present disclosure, determining the reference TWD camera transformation matrix further may include generating a deviation-compensated reference graphic matrix by summing the intended reference graphic matrix and the reference camera deviation matrix. Determining the reference TWD camera transformation matrix further may include projecting a deviation-compensated reference graphic on the reference windscreen using the reference TWD projector. A location of each of a plurality of projected dots of the deviation-compensated reference graphic is defined by the deviation-compensated reference graphic matrix. Determining the reference TWD camera transformation matrix further may include capturing a second reference image of the deviation-compensated reference graphic using a reference TWD camera. Determining the reference TWD camera transformation matrix further may include identifying a plurality of perceived dots of the deviation-compensated reference graphic in the second reference image. Determining the reference TWD camera transformation matrix further may include determining an actual x-coordinate and an actual y-coordinate of each of the plurality of perceived dots of the deviation-compensated reference graphic in the second reference image. Determining the reference TWD camera transformation matrix further may include generating a reference TWD camera matrix. Each element of the reference TWD camera matrix contains the actual x-coordinate and the actual y-coordinate of one of the plurality of perceived dots of the deviation-compensated reference graphic in the second reference image. Determining the reference TWD camera transformation matrix further may include determining the reference TWD camera transformation matrix by subtracting the reference TWD camera matrix from the reference camera deviation matrix.

In another aspect of the present disclosure, calculating the vehicle TWD calibration matrix further may include determining a vehicle TWD deviation matrix based at least in part on the reference TWD camera matrix and the calibration image of the reference graphic. Calculating the vehicle TWD calibration matrix further may include calculating the vehicle TWD calibration matrix based at least in part on the vehicle TWD deviation matrix.

In another aspect of the present disclosure, determining the vehicle TWD deviation matrix further may include identifying a plurality of perceived dots of the reference graphic in the calibration image. Determining the vehicle TWD deviation matrix further may include determining an actual x-coordinate and an actual y-coordinate of each of the plurality of perceived dots of the reference graphic in the calibration image. Determining the vehicle TWD deviation matrix further may include generating an actual vehicle TWD matrix. Each element of the actual vehicle TWD matrix contains the actual x-coordinate and the actual y-coordinate of one of the plurality of perceived dots of the reference graphic in the calibration image. Determining the vehicle TWD deviation matrix further may include calculating the vehicle TWD deviation matrix by subtracting the actual vehicle TWD matrix from the reference TWD camera matrix.

In another aspect of the present disclosure, calculating the vehicle TWD calibration matrix further may include calculating the vehicle TWD calibration matrix by subtracting the TWD deviation matrix from the TWD camera transformation matrix.

In another aspect of the present disclosure, the method further includes applying the vehicle TWD calibration matrix to each frame projected using the vehicle TWD projector.

According to several aspects, a system for calibrating a display for a vehicle is provided. The system includes a vehicle display system including a vehicle windscreen and a vehicle TWD projector. The vehicle TWD projector includes a vehicle TWD camera. The vehicle display system further includes a vehicle controller in electrical communication with the vehicle TWD projector. The vehicle controller is programmed to project a reference graphic on the vehicle windscreen using the vehicle TWD projector. The vehicle controller is further programmed to capture a calibration image of the reference graphic using the vehicle TWD camera. The vehicle controller is further programmed to calculate a vehicle TWD calibration matrix based at least in part on a first reference calibration matrix, a second reference calibration matrix, and the calibration image of the reference graphic.

In another aspect of the present disclosure, to calculate the vehicle TWD calibration matrix, the vehicle controller is further programmed to identify a plurality of perceived dots of the reference graphic in the calibration image. To calculate the vehicle TWD calibration matrix, the vehicle controller is further programmed to determine an actual x-coordinate and an actual y-coordinate of each of the plurality of perceived dots of the reference graphic in the calibration image. To calculate the vehicle TWD calibration matrix, the vehicle controller is further programmed to generate an actual vehicle TWD matrix. Each element of the actual vehicle TWD matrix contains the actual x-coordinate and the actual y-coordinate of one of the plurality of perceived dots of the reference graphic in the calibration image. To calculate the vehicle TWD calibration matrix, the vehicle controller is further programmed to calculate a vehicle TWD deviation matrix by subtracting the actual vehicle TWD matrix from the at least one reference calibration matrix. To calculate the vehicle TWD calibration matrix, the vehicle controller is further programmed to calculate the vehicle TWD calibration matrix by subtracting the TWD deviation matrix from the TWD camera transformation matrix.

In another aspect of the present disclosure, The vehicle controller is further programmed to apply the vehicle TWD calibration matrix to each frame projected using the vehicle TWD projector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicle displays, especially head-up displays (HUD) such as, for example, transparent windscreen displays (TWD) may require calibration due to manufacturing and installation variations in windscreen and display components. However, calibration during vehicle production may be time- and resource-consuming. Accordingly, the present disclosure provides systems and methods for automatic calibration of vehicle displays, including TWD systems.

Figure 1:
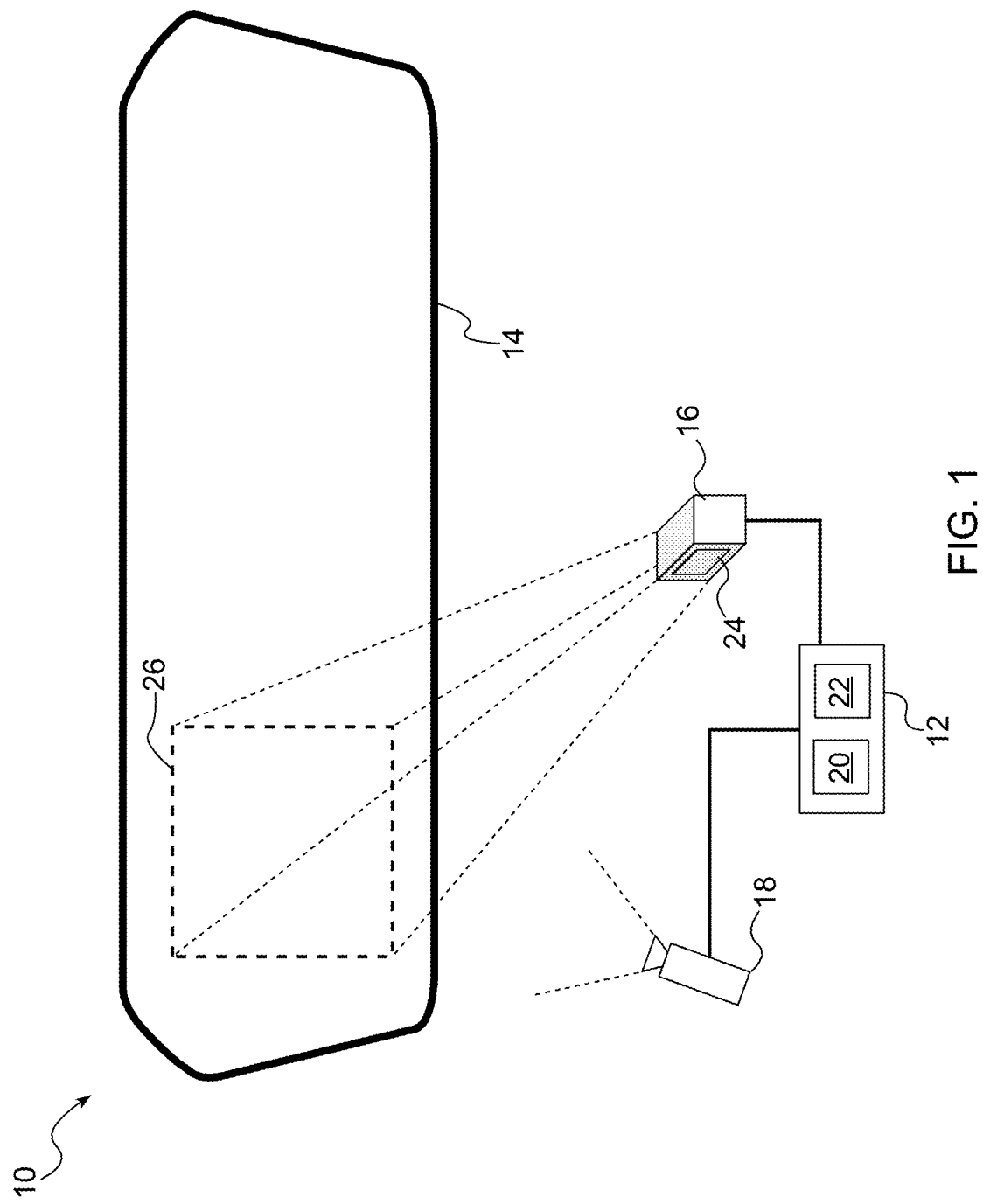
FIG. 1 is a schematic diagram of a reference calibration system, according to an exemplary embodiment.

Referring to FIG. 1, a reference calibration system is illustrated and generally indicated by reference number 10. The system 10 generally includes a reference controller 12, a reference windscreen 14, a reference transparent windscreen display (TWD) projector 16, and a reference camera 18.

The reference controller 12 is used to implement a method 100 for calibrating a display for a vehicle, as will be described below. The reference controller 12 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the reference controller 12, a semiconductor-based microprocessor (in the form of a microchip or chip set), a macroprocessor, a combination thereof, or generally a device for executing instructions. The computer readable storage device or media 22 may include volatile and non-volatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the reference controller 12 to control the system 10. The reference controller 12 may also consist of multiple controllers which are in electrical communication with each other. In a non-limiting example, the reference controller 12 includes or is integrated in a computer system, such as, for example, a server computer, a workstation computer, a personal computer, and/or the like.

The reference controller 12 is in electrical communication with the reference TWD projector 16 and the reference camera 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the reference controller 12 are within the scope of the present disclosure.

The reference windscreen 14 is used to provide a reference projection surface for the system 10. In an exemplary embodiment, the reference windscreen 14 is selected such that a plurality of variable characteristics of the reference windscreen 14 are within a predetermined range for each of the plurality of variable characteristics. In the scope of the present disclosure, the plurality of variable characteristics includes characteristics of the reference windscreen 14 which may be affected by manufacturing variation, such as, for example, curvature, glass thickness uniformity, glass surface quality, glass coating uniformity, and/or the like. In an exemplary embodiment, the predetermined range for each of the plurality of variable characteristics is determined based at least in part on a statistical analysis of a plurality of windscreens. In a non-limiting example, the predetermined range for each of the plurality of variable characteristics is plus or minus one standard deviation from the average value of each of the plurality of variable characteristics. Therefore, the reference windscreen 14 is selected such that the reference windscreen 14 is a statistically accurate approximation of a typical windscreen.

The reference windscreen 14 includes transparent phosphors (not shown) embedded into the reference windscreen 14. The transparent phosphors are light emitting particles which fluoresce in response to being excited by the reference TWD projector 16. In an exemplary embodiment, the transparent phosphors are red, green, and blue (RGB) phosphors. The use of monochrome and/or two-color phosphors is also within the scope of the present disclosure. When excitation light is absorbed by the transparent phosphors, visible light is emitted by the transparent phosphors. The excitation light is provided by the reference TWD projector 16.

The reference TWD projector 16 is used to excite the transparent phosphors in a predetermined pattern to produce the TWD graphics on the reference windscreen 14. In a first exemplary embodiment, the reference TWD projector 16 is a violet/ultraviolet laser projector disposed proximally to the headliner of the vehicle 32. In another exemplary embodiment, the reference TWD projector 16 is an LED-based projector, as discussed in U.S. application Ser. No. 18/186,343 titled "GRAPHICS PROJECTOR FOR USE IN A VEHICLE" filed on Mar. 20, 2023, the entire contents of which is hereby incorporated by reference. The reference TWD projector 16 is configured to selectively excite the red, green, or blue transparent phosphors of the reference windscreen 14. The reference TWD projector 16 has a field-of-projection 26. In the scope of the present disclosure, the field-of-projection 26 defines an area upon which the reference TWD projector 16 is capable of projection. In a non-limiting example, the field-of-projection 26 is defined by pixel width and a pixel height (e.g., 1920×1920 pixels).

The reference TWD projector 16 further includes a reference TWD camera 24. The reference TWD camera 24 is a photo and/or video camera which views the reference windscreen 14 from the perspective of the reference TWD projector 16. In an exemplary embodiment, the reference TWD camera 24 is integrated in the reference TWD projector 16, for example, having a lens adjacent to a projection lens of the reference TWD projector 16. The reference TWD projector 16 is fixedly mounted at a predetermined location and angle relative to the reference windscreen 14, such that variation due to installation or mounting of the reference windscreen 14 and the reference TWD projector 16 is eliminated. The reference TWD projector 16 and the reference TWD camera 24 are in electrical communication with the reference controller 12 as discussed in greater detail above.

The reference camera 18 is used to capture images and/or videos of the reference windscreen 14. In an exemplary embodiment, the reference camera 18 is a photo and/or video camera which is positioned to view the reference windscreen 14. The reference camera 18 is fixedly mounted at a predetermined location and angle relative to the reference windscreen 14. In an exemplary embodiment, the predetermined location of the reference camera 18 is a reference occupant eyellipse location. In the scope of the present disclosure, an occupant eyellipse location represents an eye location and orientation for a typical occupant while sitting in a vehicle seat. Therefore, the reference occupant eyellipse location is a location relative to the reference windscreen 14 where the occupant eyellipse would be located if an occupant were to sit in a vehicle seat at a same height, distance, orientation, and angle from the reference windscreen 14 as in a vehicle. Accordingly, the reference camera 18 is configured to view the reference windscreen 14 from a perspective of an occupant of a vehicle if the reference windscreen 14 were installed in said vehicle. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The reference camera 18 is in electrical communication with the reference controller 12 as discussed in greater detail above.

Figure 2:
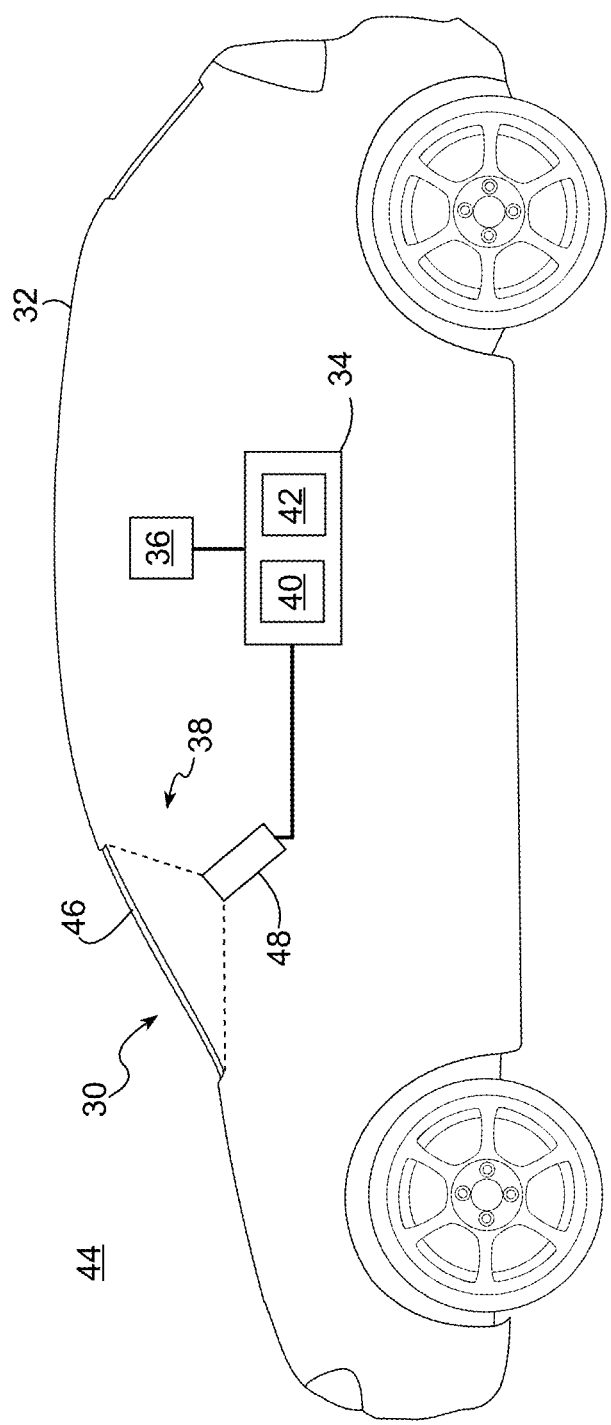
FIG. 2 is a schematic diagram of a vehicle display system, according to an exemplary embodiment.

Referring to FIG. 2, a vehicle display system is illustrated and generally indicated by reference number 30. The system 30 is shown with an exemplary vehicle 32. While a passenger vehicle is illustrated, it should be appreciated that the vehicle 32 may be any type of vehicle without departing from the scope of the present disclosure. The system 30 generally includes a vehicle controller 34, vehicle sensors 36, and a transparent windscreen display (TWD) system 38.

The vehicle controller 34 is used to implement the method 100 for calibrating a display for a vehicle, as will be described below. The vehicle controller 34 includes at least one processor 40 and a non-transitory computer readable storage device or media 42. The processor 40 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 42 may include volatile and non-volatile storage in read-only memory (ROM), random-access memory (RAM), and keep-alive memory (KAM), for example. KAM is a persistent or non-volatile memory that may be used to store various operating variables while the processor 40 is powered down. The computer-readable storage device or media 42 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 to control various systems of the vehicle 32. The vehicle controller 34 may also consist of multiple controllers which are in electrical communication with each other. The vehicle controller 34 may be inter-connected with additional systems and/or controllers of the vehicle 32, allowing the vehicle controller 34 to access data such as, for example, speed, acceleration, braking, and steering angle of the vehicle 32.

The vehicle controller 34 is in electrical communication with the vehicle sensors 36 and the TWD system 38. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 34 are within the scope of the present disclosure.

The vehicle sensors 36 are used to determine information about an environment 44 surrounding the vehicle 82. In an exemplary embodiment, the vehicle sensors 36 include at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors further includes sensors to determine information about the environment 44 surrounding the vehicle 32, for example, an ambient air temperature sensor, a barometric pressure sensor, and/or a photo and/or video camera which is positioned to view the environment 44 in front of the vehicle 32. In another exemplary embodiment, at least one of the vehicle sensors 36 is capable of measuring distances in the environment 44 surrounding the vehicle 32. In a non-limiting example wherein the vehicle sensors 36 include a camera, the vehicle sensors 36 measure distances using an image processing algorithm configured to process images from the camera and determine distances between objects. In another non-limiting example, the vehicle sensors 36 include a stereoscopic camera having distance measurement capabilities. In one example, at least one of the vehicle sensors 36 is affixed inside of the vehicle 32, for example, in a headliner of the vehicle 32, having a view through a vehicle windscreen 46. In another example, at least one of the vehicle sensors 36 is affixed outside of the vehicle 32, for example, on a roof of the vehicle 32, having a view of the environment 44 surrounding the vehicle 32. It should be understood that various additional types of vehicle sensors, such as, for example, LiDAR sensors, ultrasonic ranging sensors, radar sensors, and/or time-of-flight sensors are within the scope of the present disclosure. The vehicle sensors 36 are in electrical communication with the vehicle controller 34 as discussed in greater detail above.

Figure 3:
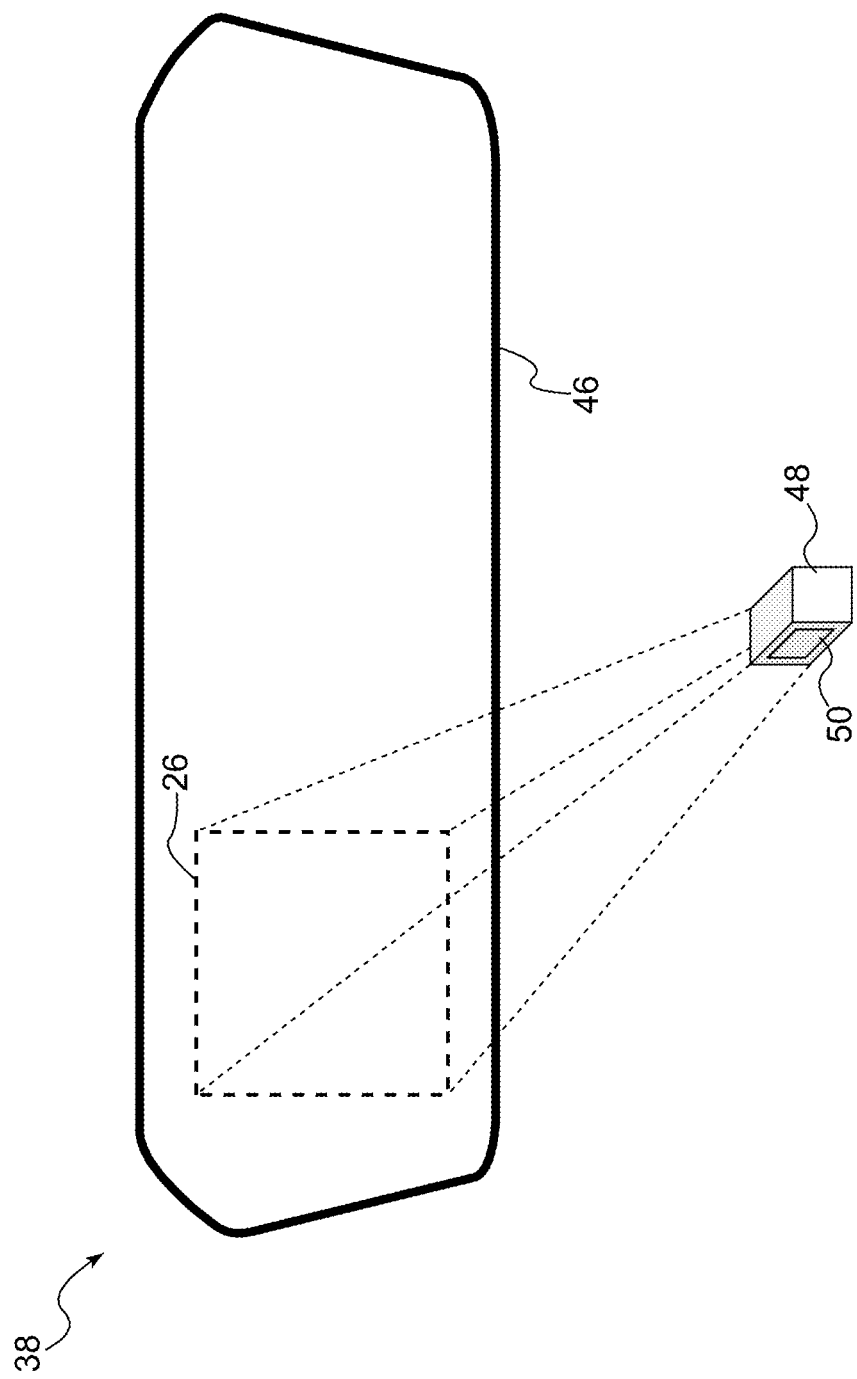
FIG. 3 is a schematic diagram of a transparent windscreen display (TWD) system, according to an exemplary embodiment.

Referring to FIG. 3, a schematic diagram of the TWD system 38 is shown. The TWD system 38 is a type of head-up display (HUD) system used to display graphics on the vehicle windscreen 46 of the vehicle 32. In an exemplary embodiment, the TWD system 38 includes transparent phosphors (not shown) embedded into the vehicle windscreen 46 and a vehicle TWD projector 48. The TWD system 38 is in electrical communication with the vehicle controller 34 as discussed above.

The transparent phosphors are light emitting particles which fluoresce in response to being excited by the vehicle TWD projector 48. In an exemplary embodiment, the transparent phosphors are red, green, and blue (RGB) phosphors, allowing full color operation of the TWD system 38. The use of monochrome and/or two-color phosphors is also within the scope of the present disclosure. When excitation light is absorbed by the transparent phosphors, visible light is emitted by the transparent phosphors. The excitation light is provided by the vehicle TWD projector 48.

The vehicle TWD projector 48 is used to excite the transparent phosphors in a predetermined pattern to produce the TWD graphics on the vehicle windscreen 46. In a first exemplary embodiment, the vehicle TWD projector 48 is a violet/ultraviolet laser projector disposed proximally to the headliner of the vehicle 32. In another exemplary embodiment, the vehicle TWD projector 48 is an LED-based projector, as discussed above. The vehicle TWD projector 48 is configured to selectively excite the red, green, or blue transparent phosphors of the vehicle windscreen 46. The vehicle TWD projector 48 has a field-of-projection 26. In the scope of the present disclosure, the field-of-projection 26 defines an area upon which the vehicle TWD projector 48 is capable of projection. In a non-limiting example, the field-of-projection 26 is defined by pixel width and a pixel height (e.g., 1920×1920 pixels).

The vehicle TWD projector 48 further includes a vehicle TWD camera 50. The vehicle TWD camera 50 is a photo and/or video camera which views the vehicle windscreen 46 from the perspective of the vehicle TWD projector 48. In an exemplary embodiment, the vehicle TWD camera 50 is integrated in the vehicle TWD projector 48, for example, having a lens adjacent to a projection lens of the vehicle TWD projector 48. The vehicle TWD projector 48 and the vehicle TWD camera 50 are in electrical communication with the vehicle controller 34 as discussed in greater detail above.

Referring again to FIG. 2 and with continued reference to FIG. 3, in an exemplary embodiment, the vehicle controller 34 uses the TWD system 38 to display graphics indicating conditions of the vehicle 32 and/or the environment 44 surrounding the vehicle 32 detected by the vehicle sensors 36. In a non-limiting example, the TWD system 38 is used as a primary instrument to display information such as, for example, vehicle speed, coolant temperature, fuel level, state of charge, and/or the like. In another non-limiting example, the vehicle controller 34 uses the TWD system 38 to highlight an object of interest in the environment 44 surrounding the vehicle 32, for example, a hazardous object in a path of the vehicle 32. Using the vehicle sensors 36, the vehicle controller 34 identifies an object of interest and determines a position of the object of interest relative to the vehicle 32. Subsequently, the vehicle controller 34 uses the TWD system 38 to display a graphic which appears, from a perspective of a vehicle occupant, to be overlayed on the object of interest based at least on the position of the object of interest relative to the vehicle 32. In an exemplary embodiment, the graphics are calibrated before display such that distortion of the graphics caused by various characteristics of the TWD system 38 is mitigated, as will be discussed in greater detail below in reference to the method 100. Use of the TWD system 38 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

Figure 4:
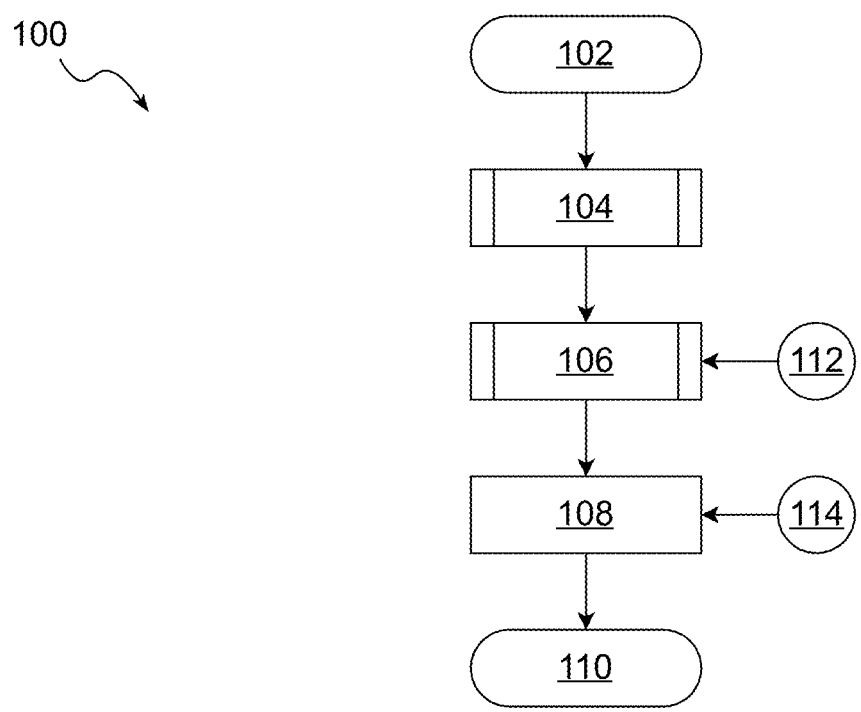
FIG. 4 is a flowchart of a method for calibrating a display for a vehicle, according to an exemplary embodiment.

Referring to FIG. 4, a flowchart of the method 100 for calibrating a display for a vehicle is shown. In the method 100, the system 10 and the system 30 may be used together to constitute a system for calibrating a display for a vehicle, which is used to perform the method 100. The method 100 begins at block 102 and proceeds to block 104. At block 104, the system 10 is used to calculate at least one reference calibration matrix, as will be discussed in greater detail below. After block 104, the method 100 proceeds to block 106. At block 106, the system 30 is used to calculate a vehicle TWD calibration matrix, as will be discussed in greater detail below. After block 106, the method 100 proceeds to block 108.

At block 108, the system 30 is used to display a graphic based at least in part on the vehicle TWD calibration matrix calculated at block 106. In an exemplary embodiment, the vehicle controller 34 identifies an object of interest as discussed above and determines a graphic to display using the TWD system 38. In a non-limiting example, the object of interest is an obstacle on a roadway in the environment 44 surrounding the vehicle 32 and the graphic is an animated warning indication including multiple video frames displayed in succession. To display each frame of the animated warning indication, the vehicle controller 34 applies the vehicle TWD calibration matrix calculated at block 106 to each frame of the animated warning indication. In a non-limiting example, to apply the vehicle TWD calibration matrix, the vehicle controller 34 adds the vehicle TWD calibration matrix to a matrix defining each frame of the animated warning indication before projecting each frame of the animated warning indication using the vehicle TWD projector 48. Therefore, each frame of the animated warning indication is compensated for distortion. After block 108, the method 100 proceeds to enter a standby state at block 110. It should be understood that the method 100 may be repeated for additional areas (i.e., additional fields-of-projection 26) of the reference windscreen 14 and/or the vehicle windscreen 46 to compensate and display graphics on an entire windscreen surface.

It should be understood that the method 100 may periodically exit the standby state 110 and repeat some or all of the method steps. In an exemplary embodiment, the method 100 includes a first reentry point 112 and a second reentry point 114 from which the method 100 may begin in certain conditions. In an exemplary embodiment, the first reentry point 112 is used if parts of the system 30 are replaced. In a non-limiting example, if the vehicle windscreen 46 and/or the vehicle TWD projector 48 are replaced, it is necessary to re-calculate the vehicle TWD calibration matrix at block 106. Therefore, the first reentry point 112 of the method 100 is used. For example, the method 100 may be initiated to begin at the first reentry point 112 by a service technician after replacing the vehicle windscreen 46 and/or the vehicle TWD projector 48. In an exemplary embodiment, the second reentry point 114 is used in normal operation of the system 30 to display compensated graphics. In a non-limiting example, the method 100 exits the standby state 110 and reenters the method 100 at the second reentry point 114 on a timer, for example, every three hundred milliseconds.

Figure 5:
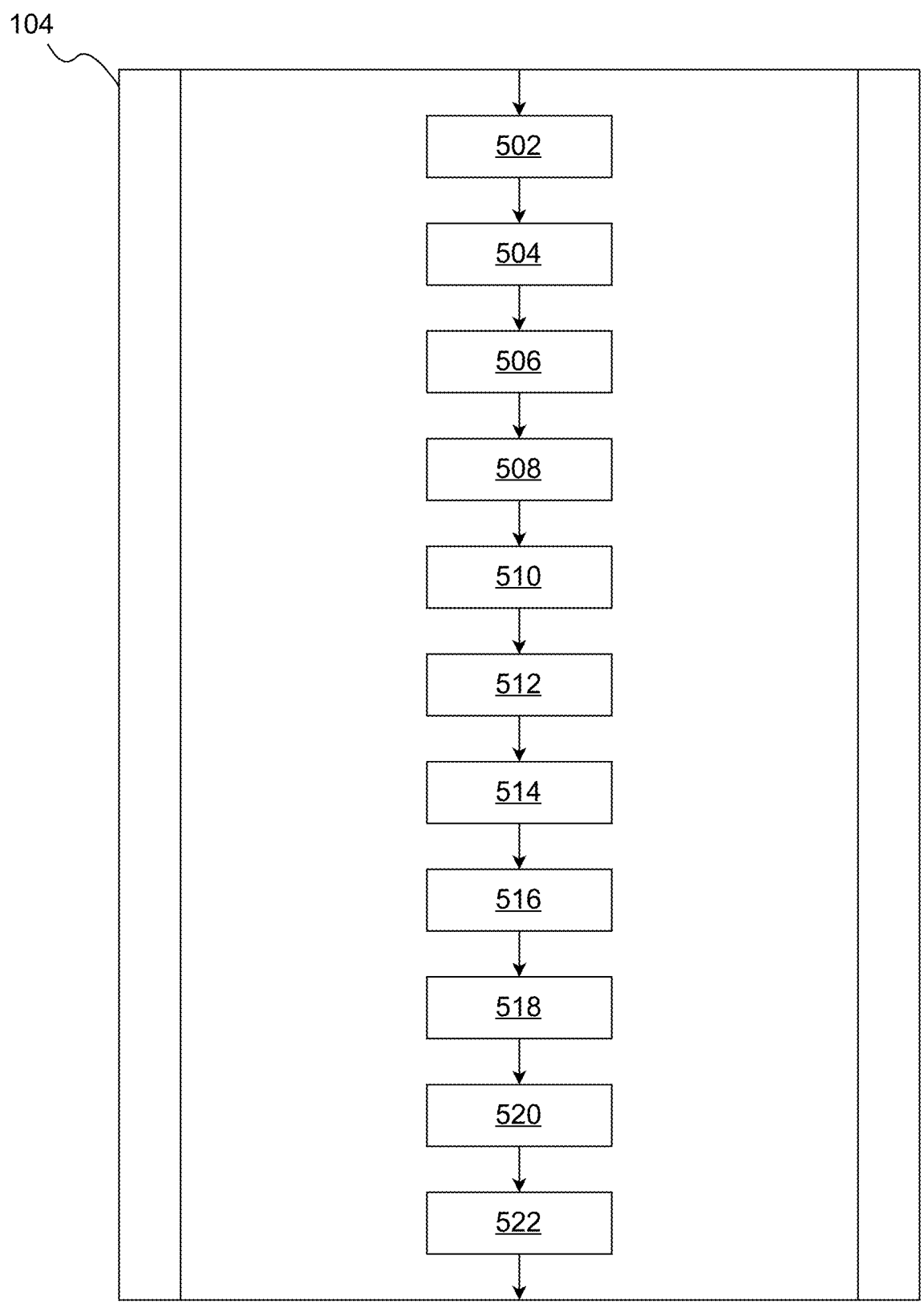
FIG. 5 is a flowchart of an exemplary embodiment of a method for calculating at least one reference calibration matrix, according to an exemplary embodiment.
Figure 6A:
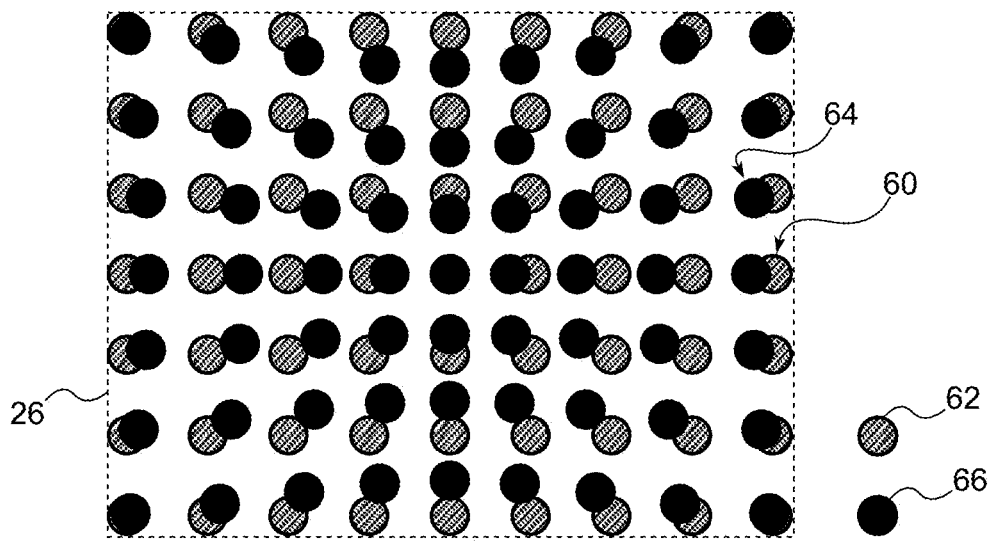
FIG. 6A is a first exemplary view of a field of projection of the reference calibration system, according to an exemplary embodiment.

Referring to FIG. 5, a flowchart of an exemplary embodiment of block 104 is shown. Referring also to FIG. 6A, a first exemplary view of the field-of-projection 26 of the system 10 is shown. The exemplary embodiment of block 104 begins at block 502. At block 502, the reference controller 12 uses the reference TWD projector 16 to project a reference graphic 60 on the reference windscreen 14. In the scope of the present disclosure, the reference graphic 60 includes a plurality of projected dots 62 arranged in a uniform two-dimensional array or grid (i.e., a distance between each dot and the surrounding dots is consistent). Each of the plurality of projected dots 62 has an intended x-coordinate and an intended y-coordinate defined relative to the field-of-projection 26. The reference graphic 60 is represented as an intended reference graphic matrix. In the scope of the present disclosure, the intended reference graphic matrix is a two-dimensional matrix having a plurality of elements. Each of the plurality of elements of the intended reference graphic matrix defines a location of one of the plurality of projected dots 62 by storing the intended x-coordinate and the intended y-coordinate of the one of the plurality of projected dots 62. For the exemplary reference graphic 60 shown in FIG. 6A, the intended reference graphic matrix is:

$$I = \begin{bmatrix} x_1, y_1 & \cdots & x_9, y_1 \\ \vdots & & \vdots \\ x_1, y_7 & \cdots & x_9, y_7 \end{bmatrix} \quad (1)$$

wherein I is the intended reference graphic matrix, $x_n$ is the intended x-coordinate of one of the plurality of projected dots 62 located in column n of the intended reference graphic matrix, and y m is the intended y-coordinate of one of the plurality of projected dots 62 located in row m of the intended reference graphic matrix. It should be understood that the reference graphic 60 may have any number of dots and the intended reference graphic matrix may have any number of rows and/or columns without departing from the scope of the present disclosure. After block 502, the exemplary embodiment of block 104 proceeds to block 504.

At block 504, the reference controller 12 uses the reference camera 18 to capture a first reference image 64 of the reference graphic 60 on the reference windscreen 14. Due to manufacturing variation (e.g., curvature variation, glass thickness uniformity variation, glass surface quality variation, glass coating uniformity variation, and/or the like) of the reference windscreen 14, the reference graphic 60 appears distorted in the first reference image 64. In other words, the location of each of the plurality of projected dots 62 of the reference graphic 60 does not correspond with the location of each of a plurality of perceived dots 66 in the first reference image 64, as shown in FIG. 6A. In the scope of the present disclosure, perceived dots 66 refer to dots as they are perceived by one of the reference camera 18, the reference TWD camera 24, or the vehicle TWD camera 50. After block 504, the exemplary embodiment of block 104 proceeds to block 506.

At block 506, the reference controller 12 identifies the plurality of perceived dots 66 in the first reference image 64 captured at block 504. In an exemplary embodiment, the reference controller 12 uses a computer vision algorithm to identify the plurality of perceived dots 66 in the first reference image 64. In the scope of the present disclosure, identifying the plurality of perceived dots 66 means that the reference controller 12 isolates the plurality of perceived dots 66 from other elements in the first reference image 64 (e.g., background objects, dust particles, camera artifacts, and/or the like) such that a location of each of the plurality of perceived dots 66 may be determined, as discussed below. In an exemplary embodiment, the computer vision algorithm is trained by providing the computer vision algorithm with a plurality of images including dots at various positions and angles. After sufficient training of the computer vision algorithm, the reference controller 12 can identify the plurality of perceived dots 66 in the first reference image 64 with a high degree of accuracy and precision. After identifying the plurality of perceived dots 66 in the first reference image 64, the reference controller 12 determines an actual x-coordinate and an actual y-coordinate of each of the plurality of perceived dots 66 in the first reference image 64. In an exemplary embodiment, the actual coordinates of each of the plurality of perceived dots 66 in the first reference image 64 are identified by performing pixel measurements to each of the plurality of perceived dots 66 relative to the field-of-projection 26 in the first reference image 64. After block 506, the exemplary embodiment of block 104 proceeds to block 508.

At block 508, the reference controller 12 generates an actual reference graphic matrix. In the scope of the present disclosure, the actual reference graphic matrix contains the actual x-coordinate and the actual y-coordinate of each of the plurality of perceived dots 66 in the first reference image 64, as determined at block 506. After block 508, the exemplary embodiment of block 104 proceeds to block 510.

At block 510, the reference controller 12 calculates a reference camera deviation matrix. In the scope of the present disclosure, the reference camera deviation matrix encodes differences between the reference graphic 60 and the first reference image 64. In an exemplary embodiment, to calculate the reference camera deviation matrix, the actual reference graphic matrix generated at block 508 is subtracted from the intended reference graphic matrix. After block 510, the exemplary embodiment of block 104 proceeds to block 512.

At block 512, the reference controller 12 generates a deviation-compensated reference graphic matrix by summing the intended reference graphic matrix with the reference camera deviation matrix determined at block 510. After block 512, the exemplary embodiment of block 104 proceeds to block 514.

Figure 6B:
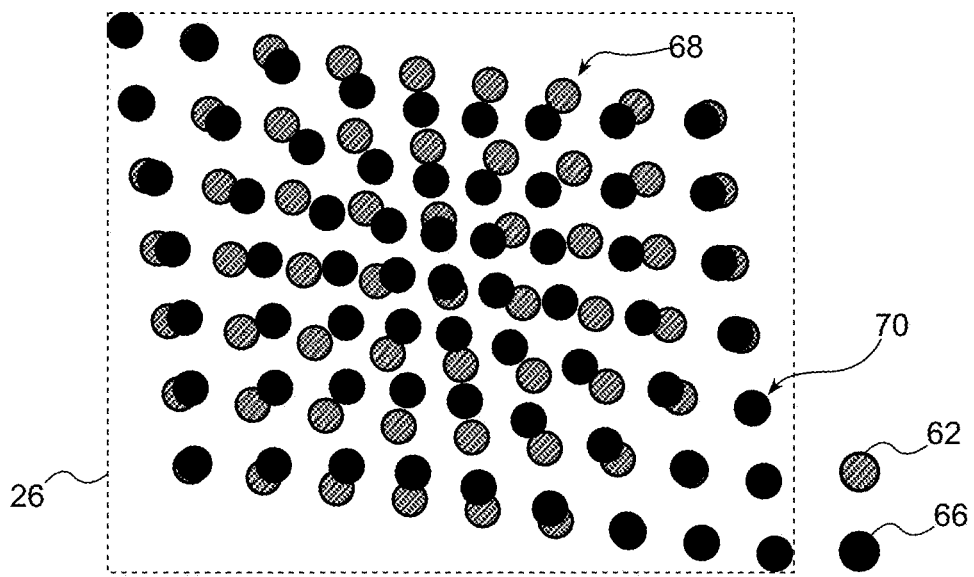
FIG. 6B is a second exemplary view of a field of projection of the reference calibration system, according to an exemplary embodiment.

Referring to FIG. 6B, a second exemplary view of the field-of-projection 26 of the system 10 is shown. With continued reference to FIGS. 5, 6A and 6B, at block 514, the reference controller 12 uses the reference TWD projector 16 to project a deviation-compensated reference graphic 68 on the reference windscreen 14. The location of each of the plurality of projected dots 62 of the deviation-compensated reference graphic is defined by the deviation-compensated reference graphic matrix generated at block 512. After block 514, the exemplary embodiment of block 104 proceeds to block 516.

At block 516, the reference controller 12 uses the reference TWD camera 24 to capture a second reference image 70 of the deviation-compensated reference graphic 68 on the reference windscreen 14. Due to the predetermined location and angle of the reference TWD camera 24 relative to the reference windscreen 14, the deviation-compensated reference graphic 68 appears distorted in the second reference image 70. In other words, the location of each of the plurality of projected dots 62 of the deviation-compensated reference graphic 68 does not correspond with the location of each of a plurality of perceived dots 66 in the second reference image 70, as shown in FIG. 6B. After block 516, the exemplary embodiment of block 104 proceeds to block 518.

At block 518, the reference controller 12 identifies the plurality of perceived dots 66 in the second reference image 70 captured at block 516. In an exemplary embodiment, the reference controller 12 uses a computer vision algorithm to identify the plurality of perceived dots 66 in the second reference image 70. In the scope of the present disclosure, identifying the plurality of perceived dots 66 means that the reference controller 12 isolates the plurality of perceived dots 66 from other elements in the second reference image 70 (e.g., background objects, dust particles, camera artifacts, and/or the like) such that a location of each of the plurality of perceived dots 66 may be determined, as discussed below. In an exemplary embodiment, the computer vision algorithm is trained by providing the computer vision algorithm with a plurality of images including dots at various positions and angles. After sufficient training of the computer vision algorithm, the reference controller 12 can identify the plurality of perceived dots 66 in the second reference image 70 with a high degree of accuracy and precision. After identifying the plurality of perceived dots 66 in the second reference image 70, the reference controller 12 determines an actual x-coordinate and an actual y-coordinate of each of the plurality of perceived dots 66 in the second reference image 70. In an exemplary embodiment, the actual coordinates of each of the plurality of perceived dots 66 in the second reference image 70 are identified by performing pixel measurements to each of the plurality of perceived dots 66 relative to the field-of-projection 26 in the second reference image 70. After block 518, the exemplary embodiment of block 104 proceeds to block 520.

At block 520, the reference controller 12 generates a reference TWD camera matrix. In the scope of the present disclosure, the reference TWD camera matrix contains the actual x-coordinate and the actual y-coordinate of each of the plurality of perceived dots 66 in the second reference image 70, as determined at block 518. The reference TWD camera matrix is also referred to as a type of reference calibration matrix. After block 520, the exemplary embodiment of block 104 proceeds to block 522.

At block 522, the reference controller 12 determines a reference TWD camera transformation matrix. In the scope of the present disclosure, the reference TWD camera transformation matrix defines a perspective transformation between the perspective of the reference camera 18 and the perspective of the reference TWD camera 24. The reference TWD camera transformation matrix is also referred to as a type of reference calibration matrix. In an exemplary embodiment, to determine the reference TWD camera transformation matrix, the reference TWD camera matrix determined at block 520 is subtracted from the reference camera deviation matrix determined at block 510. After block 522, the exemplary embodiment of block 104 is concluded, and the method 100 proceeds as discussed above. It should be understood that the exemplary embodiment of block 104 is performed using the system 10 and does not require use of the system 30.

Figure 7:
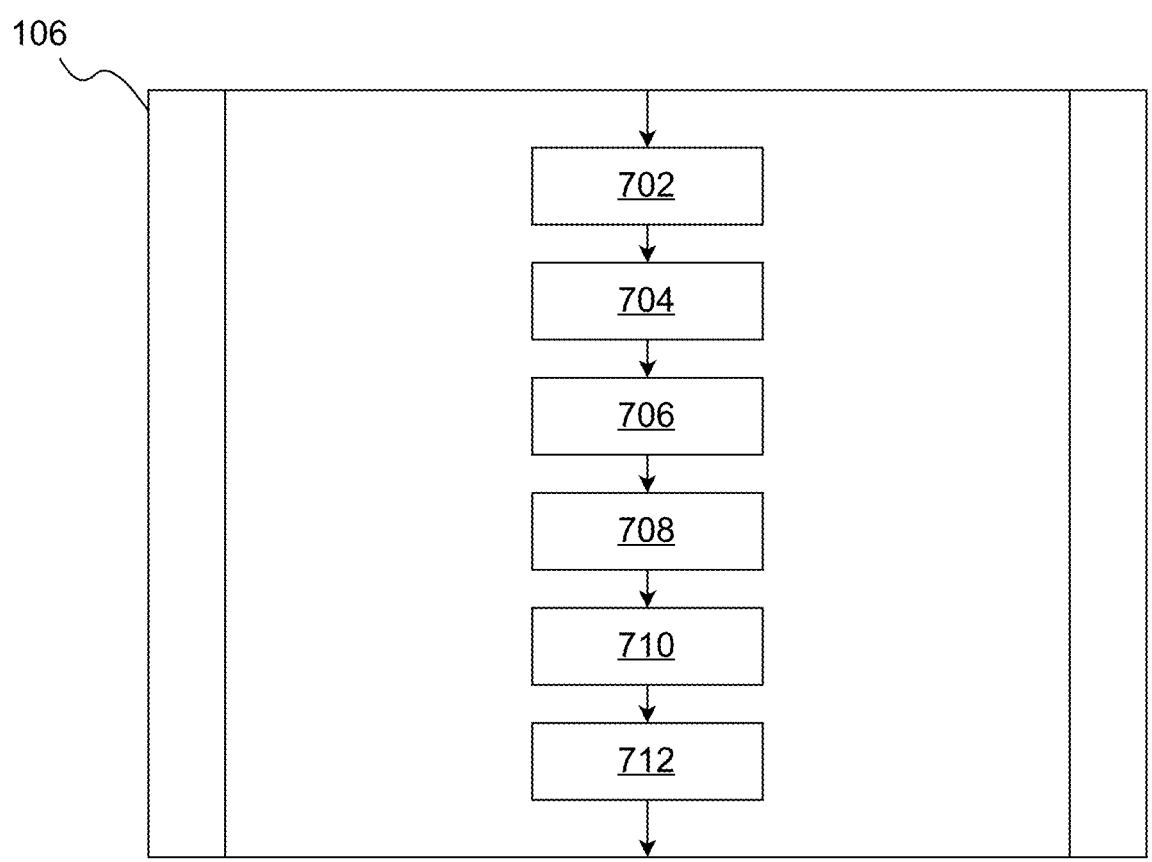
FIG. 7 is a flowchart of an exemplary embodiment of a method calculate a vehicle TWD calibration matrix, according to an exemplary embodiment.

Referring to FIG. 7, a flowchart of an exemplary embodiment of block 106 is shown. The exemplary embodiment of block 106 begins at block 702. At block 702, the vehicle controller 34 uses the vehicle TWD projector 48 to project the reference graphic 60 on the vehicle windscreen 46. After block 702, the exemplary embodiment of block 106 proceeds to block 704.

At block 704, the vehicle controller 34 uses the vehicle TWD camera 50 to capture a calibration image of the reference graphic 60 on the vehicle windscreen 46. Due to manufacturing variation (e.g., curvature variation, glass thickness uniformity variation, glass surface quality variation, glass coating uniformity variation, and/or the like) of the vehicle windscreen 46 and the location and angle of the vehicle TWD camera 50 relative to the vehicle windscreen 46, the reference graphic 60 appears distorted in the calibration image. The calibration image is substantially similar to the second reference image 70 discussed above in reference to FIG. 6B. However, the distortion of the reference graphic 60 in the calibration image may be different from the distortion of the reference graphic 60 in the second reference image 70 because of differing manufacturing variation between the reference windscreen 14 and the vehicle windscreen 46. Additionally, variation in mounting (i.e., position and angle) of the vehicle windscreen 46 and the vehicle TWD projector 48 relative to the position and angle of the reference windscreen 14 and the reference TWD projector 16 may also introduce distortion which is not present in the second reference image 70. After block 704, the exemplary embodiment of block 106 proceeds to block 706.

At block 706, the vehicle controller 34 identifies a plurality of perceived dots in the calibration image captured at block 704. In the scope of the present disclosure, identifying the plurality of perceived dots means that the vehicle controller 34 isolates the plurality of perceived dots from other elements in the calibration image (e.g., background objects, dust particles, camera artifacts, and/or the like) such that a location of each of the plurality of perceived dots may be determined, as discussed below. In an exemplary embodiment, the vehicle controller 34 uses a computer vision algorithm to identify the plurality of perceived dots in the calibration image. In an exemplary embodiment, the computer vision algorithm is trained by providing the computer vision algorithm with a plurality of images including dots at various positions and angles. After sufficient training of the computer vision algorithm, the vehicle controller 34 can identify the plurality of perceived dots in the calibration image with a high degree of accuracy and precision. After identifying the plurality of perceived dots in the calibration image, the vehicle controller 34 determines an actual x-coordinate and an actual y-coordinate of each of the plurality of perceived dots in the calibration image. In an exemplary embodiment, the actual coordinates of each of the plurality of perceived dots in the calibration image are identified by performing pixel measurements to each of the plurality of perceived dots relative to the field-of-projection 26 in the calibration image. After block 706, the exemplary embodiment of block 106 proceeds to block 708.

At block 708, the vehicle controller 34 generates an actual vehicle TWD matrix. In the scope of the present disclosure, the actual vehicle TWD matrix contains the actual x-coordinate and the actual y-coordinate of each of the plurality of perceived dots in the calibration image, as determined at block 706. After block 708, the exemplary embodiment of block 106 proceeds to block 710.

At block 710, the vehicle controller 34 calculates a vehicle TWD deviation matrix. In the scope of the present disclosure, the vehicle TWD deviation matrix encodes differences between the reference graphic 60 and the calibration image from the perspective of the vehicle TWD camera 50. In an exemplary embodiment, to calculate the vehicle TWD deviation matrix, the actual vehicle TWD matrix generated at block 708 is subtracted from the reference TWD camera matrix generated at block 520. After block 710, the exemplary embodiment of block 106 proceeds to block 712.

At block 712, the vehicle controller 34 calculates the vehicle TWD calibration matrix. In the scope of the present disclosure, the vehicle TWD calibration matrix is a 2-dimensional matrix which, when added to a matrix defining a graphic, compensates for distortion introduced by manufacturing variation and mounting variation of the vehicle windscreen 46 and the vehicle TWD projector 48. Therefore, the compensated graphic does not appear distorted to an occupant from the perspective of an occupant eyellipse of the vehicle 32. In an exemplary embodiment, to calculate the vehicle TWD calibration matrix, the vehicle TWD deviation matrix calculated at block 710 is subtracted from the reference TWD camera transformation matrix calculated at block 522. After block 712, the exemplary embodiment of block 106 is concluded and the method 100 proceeds as discussed above.

It should be understood that the vehicle TWD calibration matrix may be expanded (e.g., using mathematical interpolation and/or extrapolation) to include values corresponding to each pixel of the field-of-projection 26 without departing from the scope of the present disclosure. Furthermore, it should be understood that the system 10 and the system 30 may be used together, and that a system for calibrating a display for a vehicle can be understood to include both the system 10 and the system 30. In an exemplary embodiment, the reference TWD camera matrix and the reference TWD camera transformation matrix are transmitted from the system 10 to the system 30 using electrical communication, such as, for example, a CAN network, a FLEXRAY network, a local area network, and/or the like. In another exemplary embodiment, the reference TWD camera matrix and the reference TWD camera transformation matrix are stored in the media 42 of the vehicle controller 34 during a production, assembly, and/or programming of the vehicle controller 34.

The system 10, system 30 and method 100 of the present disclosure offer several advantages. Using the reference calibration system 10 and the method 100, the reference calibration matrices may be generated in a test environment, and may be applied to the vehicle display system 30 during production of vehicles. Thus, use of the method 100 mitigates the need for complex and/or time-consuming calibration of the vehicle display system 30 during vehicle production, and allows for an automatic calibration of the vehicle display system 30. Furthermore, use of the method 100 allows for re-calibration of the system 30 by a service technician without the need for specialized tools or equipment.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for calibrating a display for a vehicle, the system comprising:
   a reference calibration system including:
     a reference windscreen;
     a reference transparent windscreen display (TWD) projector, wherein the reference TWD projector includes a reference TWD camera;
     a reference camera; and a reference controller in electrical communication with the reference TWD projector and the reference camera, wherein the reference controller is programmed to:
project a reference graphic on the reference windscreen using the reference TWD projector, wherein the reference graphic includes a plurality of projected dots arranged in a two-dimensional array, and wherein an intended x-coordinate and an intended y-coordinate of each of the plurality of projected dots is defined by an intended reference graphic matrix;
capture a first reference image of the reference graphic using the reference camera; and
calculate at least one reference calibration matrix based at least in part on the first reference image of the reference graphic, wherein the at least one reference calibration matrix further includes a reference camera deviation matrix, wherein the reference camera deviation matrix encodes deviations in the reference graphic due to characteristics of the reference windscreen, and wherein the at least one reference calibration matrix further includes a reference TWD camera transformation matrix determined based at least in part on the reference camera deviation matrix.

2. The system of claim 1, wherein to determine the reference camera deviation matrix, the reference controller is further programmed to:
identify a plurality of perceived dots of the reference graphic in the first reference image;
determine an actual x-coordinate and an actual y-coordinate of each of the plurality of perceived dots of the reference graphic in the first reference image;
generate an actual reference graphic matrix, wherein each element of the actual reference graphic matrix contains the actual x-coordinate and the actual y-coordinate of one of the plurality of perceived dots of the reference graphic in the first reference image; and
calculate the reference camera deviation matrix by subtracting the actual reference graphic matrix from the intended reference graphic matrix.

3. The system of claim 1, wherein to determine the reference TWD camera transformation matrix, the reference controller is further programmed to:
generate a deviation-compensated reference graphic matrix by summing the intended reference graphic matrix and the reference camera deviation matrix;
project a deviation-compensated reference graphic on the reference windscreen using the reference TWD projector, wherein a location of each of a plurality of projected dots of the deviation-compensated reference graphic is defined by the deviation-compensated reference graphic matrix;
capture a second reference image of the deviation-compensated reference graphic using the reference TWD camera;
identify a plurality of perceived dots of the deviation-compensated reference graphic in the second reference image;
determine an actual x-coordinate and an actual y-coordinate of each of the plurality of perceived dots of the deviation-compensated reference graphic in the second reference image;
generate a reference TWD camera matrix, wherein each element of the reference TWD camera matrix contains the actual x-coordinate and the actual y-coordinate of one of the plurality of perceived dots of the deviation-compensated reference graphic in the second reference image; and
determine the reference TWD camera transformation matrix by subtracting the reference TWD camera matrix from the reference camera deviation matrix.

4. The system of claim 3, further comprising:
a vehicle display system including:
a vehicle windscreen;
a vehicle TWD projector, wherein the vehicle TWD projector includes a vehicle TWD camera; and
a vehicle controller in electrical communication with the vehicle TWD projector, wherein the vehicle controller is programmed to:
project the reference graphic on the vehicle windscreen using the vehicle TWD projector;
capture a calibration image of the reference graphic using the vehicle TWD camera; and
calculate a vehicle TWD calibration matrix based at least in part on the at least one reference calibration matrix and the calibration image of the reference graphic.

5. The system of claim 4, wherein to calculate the vehicle TWD calibration matrix, the vehicle controller is further programmed to:
determine a vehicle TWD deviation matrix based at least in part on the at least one reference calibration matrix and the calibration image of the reference graphic; and
calculate the vehicle TWD calibration matrix based at least in part on the vehicle TWD deviation matrix.

6. The system of claim 5, wherein to determine the vehicle TWD deviation matrix, the vehicle controller is further programmed to:
identify a plurality of perceived dots of the reference graphic in the calibration image;
determine an actual x-coordinate and an actual y-coordinate of each of the plurality of perceived dots of the reference graphic in the calibration image;
generate an actual vehicle TWD matrix, wherein each element of the actual vehicle TWD matrix contains the actual x-coordinate and the actual y-coordinate of one of the plurality of perceived dots of the reference graphic in the calibration image; and
calculate the vehicle TWD deviation matrix by subtracting the actual vehicle TWD matrix from the reference TWD camera matrix.

7. The system of claim 5, wherein to calculate the vehicle TWD calibration matrix, the vehicle controller is further programmed to:
calculate the vehicle TWD calibration matrix by subtracting the TWD deviation matrix from the reference TWD camera transformation matrix.

8. The system of claim 4, wherein the vehicle controller is further programmed to:
apply the vehicle TWD calibration matrix to each frame projected using the vehicle TWD projector.

9. The system of claim 1, wherein the reference camera is fixedly mounted at a reference occupant eyellipse location, and wherein the reference occupant eyellipse location is a predetermined location in space relative to the reference windscreen.

10. A method for calibrating a display for a vehicle, the method comprising:
projecting a reference graphic on a reference windscreen using a reference transparent windscreen display (TWD) projector;

capturing a first reference image of the reference graphic using a reference camera;
determining a reference camera deviation matrix, wherein the reference camera deviation matrix encodes deviations in the reference graphic due to characteristics of the reference windscreen;
determining a reference TWD camera transformation matrix based at least in part on the reference camera deviation matrix;
projecting the reference graphic on a vehicle windscreen using a vehicle TWD projector;
capturing a calibration image of the reference graphic using a vehicle TWD camera; and
calculating a vehicle TWD calibration matrix based at least in part on the reference camera deviation matrix, the reference TWD camera transformation matrix, and the calibration image.

11. The method of claim 10, wherein determining the reference camera deviation matrix further comprises:
identifying a plurality of perceived dots of the reference graphic in the first reference image;
determining an actual x-coordinate and an actual y-coordinate of each of the plurality of perceived dots of the reference graphic in the first reference image;
generating an actual reference graphic matrix, wherein each element of the actual reference graphic matrix contains the actual x-coordinate and the actual y-coordinate of one of the plurality of perceived dots of the reference graphic in the first reference image; and
calculating the reference camera deviation matrix by subtracting the actual reference graphic matrix from an intended reference graphic matrix, wherein the intended reference graphic matrix is a two-dimensional array including an intended x-coordinate and an intended y-coordinate of each of a plurality of projected dots.

12. The method of claim 11, wherein determining the reference TWD camera transformation matrix further comprises:
generating a deviation-compensated reference graphic matrix by summing the intended reference graphic matrix and the reference camera deviation matrix;
projecting a deviation-compensated reference graphic on the reference windscreen using the reference TWD projector, wherein a location of each of a plurality of projected dots of the deviation-compensated reference graphic is defined by the deviation-compensated reference graphic matrix;
capturing a second reference image of the deviation-compensated reference graphic using a reference TWD camera;
identifying a plurality of perceived dots of the deviation-compensated reference graphic in the second reference image;
determining an actual x-coordinate and an actual y-coordinate of each of the plurality of perceived dots of the deviation-compensated reference graphic in the second reference image;
generating a reference TWD camera matrix, wherein each element of the reference TWD camera matrix contains the actual x-coordinate and the actual y-coordinate of one of the plurality of perceived dots of the deviation-compensated reference graphic in the second reference image; and
determining the reference TWD camera transformation matrix by subtracting the reference TWD camera matrix from the reference camera deviation matrix.

13. The method of claim 12, wherein calculating the vehicle TWD calibration matrix further comprises:
determining a vehicle TWD deviation matrix based at least in part on the reference TWD camera matrix and the calibration image of the reference graphic; and
calculating the vehicle TWD calibration matrix based at least in part on the vehicle TWD deviation matrix.

14. The method of claim 13, wherein determining the vehicle TWD deviation matrix further comprises:
identifying a plurality of perceived dots of the reference graphic in the calibration image;
determining an actual x-coordinate and an actual y-coordinate of each of the plurality of perceived dots of the reference graphic in the calibration image;
generating an actual vehicle TWD matrix, wherein each element of the actual vehicle TWD matrix contains the actual x-coordinate and the actual y-coordinate of one of the plurality of perceived dots of the reference graphic in the calibration image; and
calculating the vehicle TWD deviation matrix by subtracting the actual vehicle TWD matrix from the reference TWD camera matrix.

15. The method of claim 14, wherein calculating the vehicle TWD calibration matrix further comprises:
calculating the vehicle TWD calibration matrix by subtracting the TWD deviation matrix from the reference TWD camera transformation matrix.

16. The method of claim 10, further comprising:
applying the vehicle TWD calibration matrix to each frame projected using the vehicle TWD projector.

17. A system for calibrating a display for a vehicle, the system comprising:
a vehicle display system including:
a vehicle windscreen;
a vehicle transparent windscreen display (TWD) projector, wherein the vehicle TWD projector includes a vehicle TWD camera; and
a vehicle controller in electrical communication with the vehicle TWD projector, wherein the vehicle controller is programmed to:
project a reference graphic on the vehicle windscreen using the vehicle TWD projector;
capture a calibration image of the reference graphic using the vehicle TWD camera; and
calculate a vehicle TWD calibration matrix based at least in part on a first reference calibration matrix, a second reference calibration matrix, and the calibration image of the reference graphic.

18. The system of claim 17, wherein to calculate the vehicle TWD calibration matrix, the vehicle controller is further programmed to:
identify a plurality of perceived dots of the reference graphic in the calibration image;
determine an actual x-coordinate and an actual y-coordinate of each of the plurality of perceived dots of the reference graphic in the calibration image;
generate an actual vehicle TWD matrix, wherein each element of the actual vehicle TWD matrix contains the actual x-coordinate and the actual y-coordinate of one of the plurality of perceived dots of the reference graphic in the calibration image;
calculate a vehicle TWD deviation matrix by subtracting the actual vehicle TWD matrix from at least one of: the first reference calibration matrix and the second reference calibration matrix; and calculate the vehicle TWD calibration matrix by subtracting the vehicle TWD deviation matrix from a reference TWD camera transformation matrix.

19. The system of claim 18, wherein the vehicle controller is further programmed to:
apply the vehicle TWD calibration matrix to each frame projected using the vehicle TWD projector.

\* \* \* \* \*